United States Patent
Soo et al.

(10) Patent No.: US 7,027,604 B2
(45) Date of Patent: Apr. 11, 2006

(54) CIRCUIT TO PREVENT ACOUSTIC FEEDBACK FOR A CELLULAR SPEAKERPHONE

(75) Inventors: Kee Eng Soo, Kamunting (MY); Ashok Ramakant Patil, Duluth, GA (US); Michael D. Geren, Suwanee, GA (US); Macwien Krishnamurthi Annamalai, Petaling Jaya (MY)

(73) Assignee: Motorola, Inc., Schaumburg, IL (US)

( * ) Notice: Subject to any disclaimer, the term of this patent is extended or adjusted under 35 U.S.C. 154(b) by 670 days.

(21) Appl. No.: 09/961,671

(22) Filed: Sep. 24, 2001

(65) Prior Publication Data

US 2003/0059062 A1    Mar. 27, 2003

(51) Int. Cl.
*H04B 15/00* (2006.01)
*H04R 27/00* (2006.01)
*H04M 9/00* (2006.01)

(52) U.S. Cl. .................. 381/93; 381/83; 379/388.02

(58) Field of Classification Search .................. 381/93, 381/83, 66; 379/388.07, 388.02
See application file for complete search history.

(56) References Cited

U.S. PATENT DOCUMENTS

| | | | |
|---|---|---|---|
| 3,654,486 A * | 4/1972 | Cubert | 326/130 |
| 4,081,622 A | 3/1978 | Clarke et al. | |
| 4,700,382 A * | 10/1987 | Means et al. | 379/406.16 |
| 5,333,176 A * | 7/1994 | Burke et al. | 455/557 |
| 5,583,934 A | 12/1996 | Zhou | |
| 5,867,573 A | 2/1999 | Wittman | |
| 6,690,790 B1 * | 2/2004 | Nicollini et al. | 379/392.01 |

* cited by examiner

*Primary Examiner*—Vivian Chin
*Assistant Examiner*—Devona E Faulk
(74) *Attorney, Agent, or Firm*—Hisashi D. Watanabe

(57) ABSTRACT

This invention includes a circuit for the prevention of acoustic feedback between an electronic device and an audio accessory. In a preferred embodiment, the circuit prevents audio feedback between a cellular telephone and a speakerphone accessory. The circuit includes a current limiting device coupled serially in the receive (Rx) line. The current limiting device is actuated via a delay circuit coupled between the current limiting device and the transmit (Tx) line. When a bias current is presented to the Tx line, the bias propagates through the delay circuit, thereby actuating the current limiting device a predetermined time after the presentation of the bias. The circuit keeps the Rx line open long enough for the phone to deactivate its internal microphone.

6 Claims, 1 Drawing Sheet

CIRCUIT TO PREVENT ACOUSTIC FEEDBACK FOR A CELLULAR SPEAKERPHONE

BACKGROUND

1. Technical Field

This invention relates generally to circuits for the prevention of acoustic feedback in speakerphones, and more specifically to prevention of acoustic feedback in a speaker phone accessory for cellular telephones.

2. Background Art

Cellular telephones are becoming more and more popular. According to the Cellular Telecommunications Industry Association (CTIA), cellular telephone usage in the United States increased 27% between 1999 and 2000. As of December, 2000, there were over 109 million cellular subscribers in the United States alone.

As more people carry cellular telephones, they are increasingly using them as substitutes for conventional telephones. They talk on their cellular telephones at work and at play. There are frequent times when the person needs to use both hands for a specific task while talking on the phone. For example, business people often type on a computer while talking on the phone. In such situations, it is desirable to have a speakerphone function on the phone they are using. This presents a problem when cellular telephones are being used. While some manufacturers make cellular telephones with an on-board speaker phones, like the I1000™ manufactured by Motorola, Inc., most cellular telephones do not include speakerphone functions.

Accessory manufacturers have addressed this issue by manufacturing speakerphone attachments for cellular telephones. When the cellular telephone is inserted into the speakerphone accessory, the earpiece is disabled and an external speaker is enabled. Concurrently, the internal microphone is switched off and an external microphone is enabled. The audio signal is typically coupled to the external speaker and microphone via a communication connector at the base of the phone.

One problem that typically occurs when the phone makes the transition from earpiece to external speaker involves acoustic feedback. Cellular telephones often have a time delay in switching off the microphone. Consequently, audio energy is fed from the external speaker into the internal microphone. This feedback causes an audible "squeal" that can be heard by both parties participating in the call. The squeal is both annoying and distracting.

There is thus a need for eliminating acoustic feedback in speakerphone accessories for cellular telephones.

DETAILED DESCRIPTION OF THE INVENTION

Figure 1:
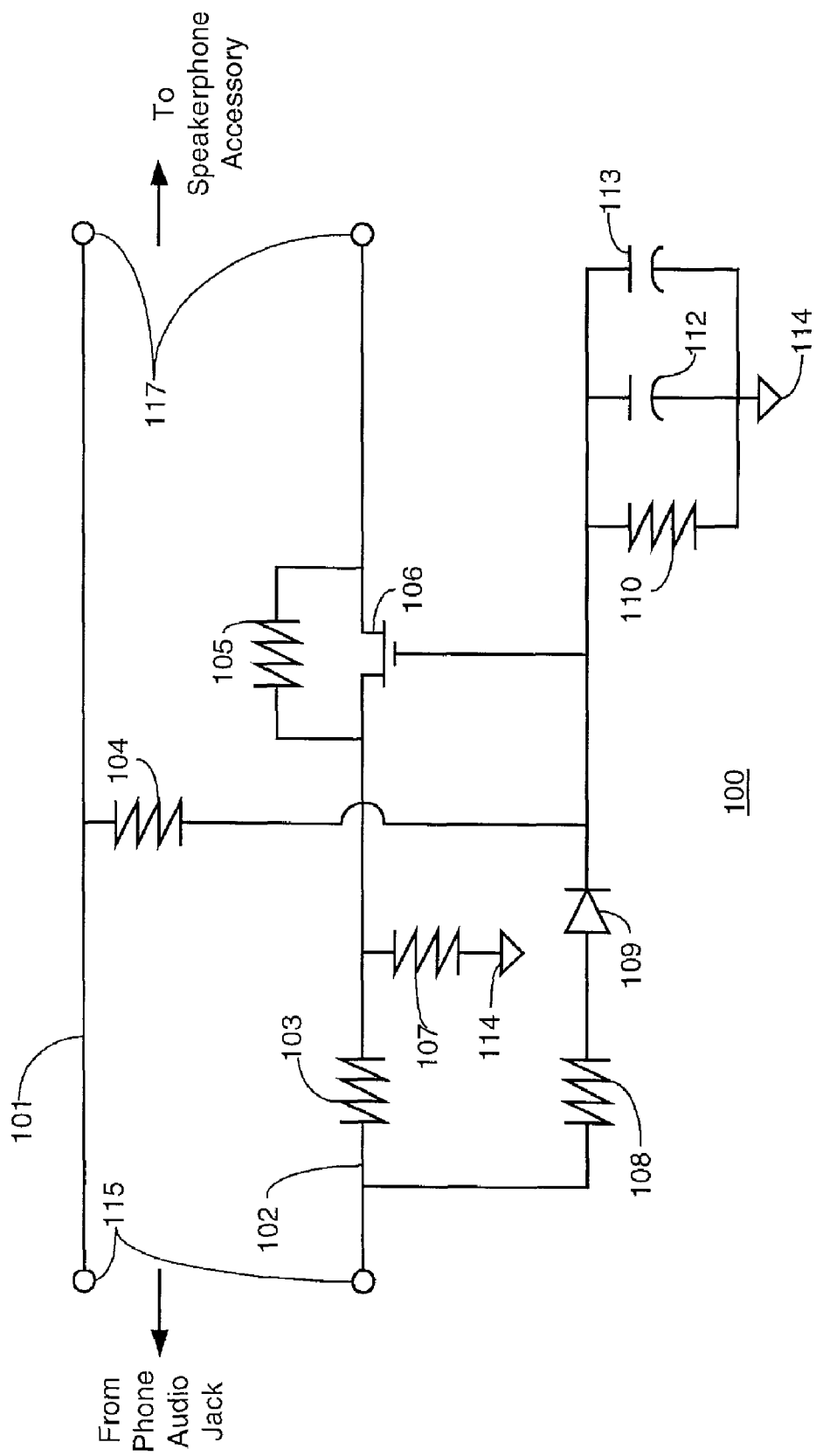
FIG. 1 is a schematic diagram in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention comprises a timing circuit, including a main switching transistor, to eliminate acoustic feedback squeal in speakerphone accessories. The squeal can be caused by delays in the deactivation of the internal speaker and microphone of the cellular telephone. This invention overcomes this problem by opening the acoustic loop long enough to allow the microphone of the cellular telephone to be deactivated.

Referring now to FIG. 1, illustrated therein is a preferred embodiment of a feedback prevention circuit in accordance with the invention. The circuit 100 may be integrated into a portable electronic device, integrated into an audio accessory, or serve as a link between a portable electronic device and an audio accessory. Portable electronic devices contemplated include telephones, radios, audio recording devices and the like. Audio accessories may include speakerphones, data recorders, and data transmitters. For simplicity of discussion, the invention will be discussed in terms of a portable cellular telephone and speaker phone, although it will be readily apparent to those of ordinary skill in the art that the invention is not so limited.

The circuit 100 includes terminals for mating to a cellular telephone 115 and terminals for mating to a speakerphone 117. The terminals provide connections for a transmit (Tx) line 101 and a receive (Rx) line 102. The Tx line 101 is a conducting path by which the phone receives data from the accessory, and the Rx line 102 is the return path. In accordance with the invention, a current blocking device 106 is coupled in series with the Rx line 102. In one preferred embodiment, the current blocking device 106 is a N-Channel enhancement type Metal Oxide Semiconductor Field Effect Transistor (MOSFET). Other devices, including Bipolar Junction Transistors (BJTs), Junction MOSFETs (JFETs), switches, relays, circuit breakers, vacuum tubes and the like would all suffice as alternative current blocking devices.

When the circuit is inactive, the phone is typically disconnected from the circuit leaving the phone terminals 115 in an electrically open state. In this condition, there is no phone input voltage present at the phone terminals 115. Thus, the MOSFET 106 is in an open, or off, state. Resistor 110 serves to couple the gate of the MOSFET 106 to ground 114. This "pull down" keeps the MOSFET 106 off so long as no voltage is present on the Tx line 101. This will be the case as long as the circuit 100 is not coupled to a phone.

Once a phone is coupled to the circuit 101 via the phone terminals 115, the phone will provide a direct-current (DC) bias on the Tx line 101. This bias is used to actuate an external microphone. When a phone is coupled to the phone connector 115 during a call, the DC bias will immediately be present on the Tx line 101. Once the DC bias is present, capacitor 112 begins to charge via the current limiting resistor 104. The charging capacitor 112 has a time delay corresponding to the resistor 104, resistor 110, capacitor 112 and capacitor 113, which is added as a noise suppressor.

Once capacitor 112 has sufficiently charged, the gate voltage of the MOSFET 106 elevates, causing the MOSFET 106 to begin conducting current, thereby allowing transmissions across the Rx line 102. By appropriately designing the delay of MOSFET 106 actuation, the designer can ensure that the MOSFET 106 remains open long enough to allow the phone's internal microphone to turn off.

The other resistors in the circuit include resistor 107, resistor 108 and resistor 103. Resistor 103 is an optional resistor that impedes conducted and radiated RF emissions. Resistor 107 serves to provide a DC path to ground 114, thereby ensuring a stable reference. While cellular telephones typically tie the Rx line 102 to ground inside the phone, this optional resistor 107 eliminates any uncertainty.

There is a potential disadvantage to the circuit, in that when the phone is coupled to the circuit 100 prior to the initiation of a call, the phone will attempt to transmit keypad tones across the Rx line 102 when the user dials a number. In some phones, the DC bias on the Tx line 101 appears only after the initiation of a call. In these systems, the user will not be able to hear the dual tone multi-frequency (DTMF) tones on the audio accessory.

This problem is eliminated with resistor 108 and diode 109. Resistor 108 and diode 109 route the initial keypad tones both across the Rx line 102 and to the gate of the MOSFET 106, thereby partially turning on the MOSFET 106. This partial conduction allows the keypad tones to pass along the Rx line 102, thereby allowing the DTMF tones to reach the audio accessory. Resistor 108 and diode 109 are independent of the timing circuit of resistors 104, 110 and capacitors 112, 113. Resistor 108 and diode 109 do not affect the feedback elimination performance. Optional resistor 105 provides an alternate path for DTMF tones, in addition to, or instead of, resistor 108 and diode 109.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A circuit for preventing audio feedback, the circuit comprising:
    a. a transmit line for transmitting data between an electronic device and an audio accessory;
    b. a receive line for transmitting data between an electronic device and an audio accessory;
    c. a MOSFET coupled in series with the receive line;
    d. a delay circuit coupled to the transmit line and the MOSFET; and
    e. a resistor and a diode that route initial keypad tones across the receive line and to the gate of said MOSFET;
    wherein when a DC electrical bias is presented to the transmit line, the bias propagates through the delay circuit and actuates the MOSFET a predetermined time after the presentation of the bias.

2. The circuit of claim 1, wherein the delay circuit comprises at least one resistor and at least one capacitor.

3. The circuit of claim 2, further comprising electrical terminals for coupling to a cellular telephone.

4. The circuit of claim 3, further comprising a resistor coupled between the receive line and the MOSFET.

5. The circuit of claim 4, further comprising a resistor coupled in parallel with the MOSFET.

6. The circuit of claim 1, wherein the diode is coupled in series between the resistor and the MOSFET.

* * * * *